UNITED STATES PATENT OFFICE.

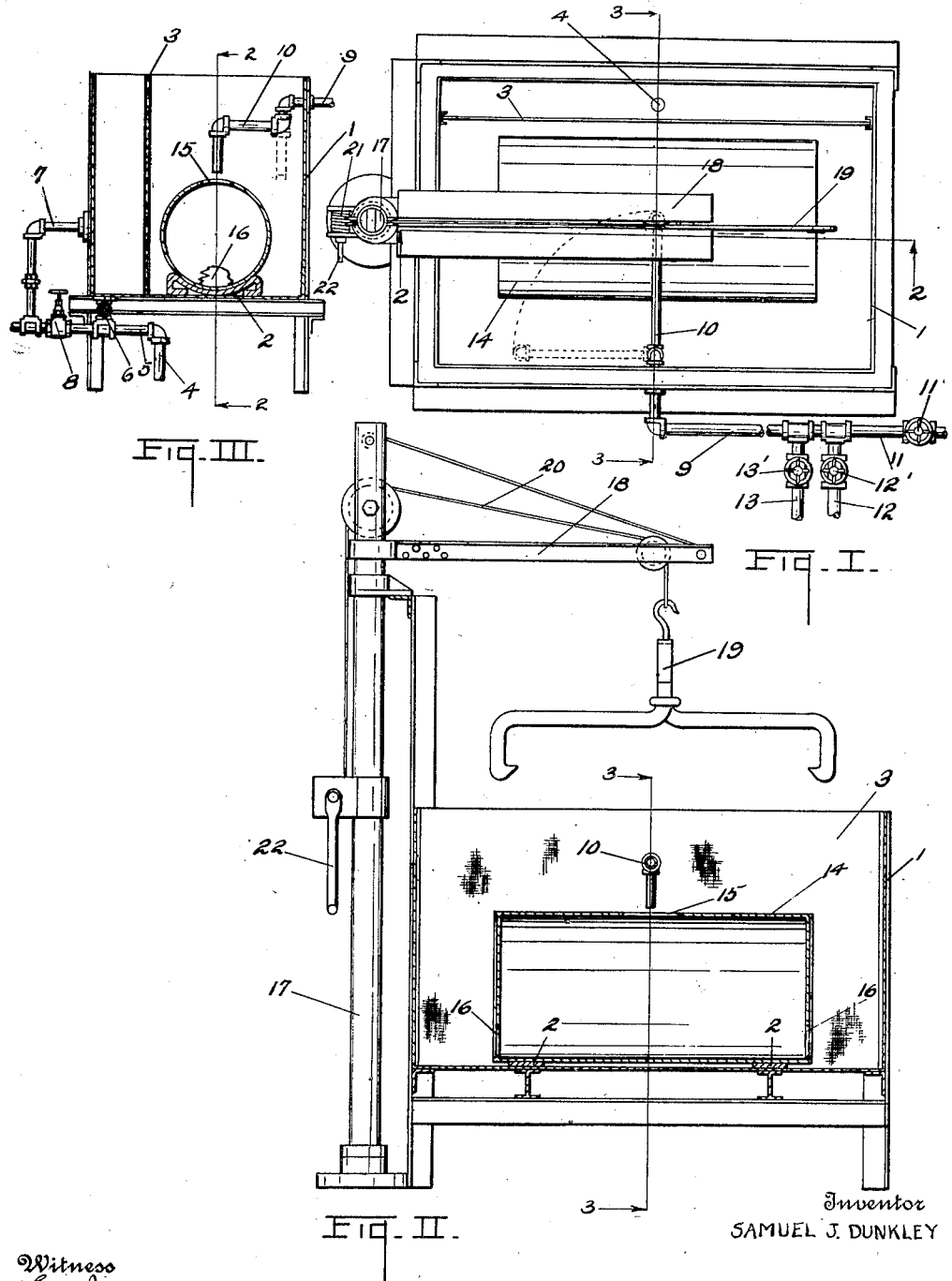

SAMUEL J. DUNKLEY, OF KALAMAZOO, MICHIGAN, ASSIGNOR TO DUNKLEY COMPANY, OF KALAMAZOO, MICHIGAN, A CORPORATION OF MICHIGAN.

MIXING-TANK.

1,374,291.        Specification of Letters Patent.        Patented Apr. 12, 1921.

Application filed January 28, 1919. Serial No. 273,600.

*To all whom it may concern:*

Be it known that I, SAMUEL J. DUNKLEY, a citizen of the United States, residing at the city and county of Kalamazoo, State of Michigan, have invented certain new and useful Improvements in Mixing-Tanks, of which the following is a specification.

This invention relates to improved mixing tanks for mixing caustic soda with water particularly for use in a lye peach peeling machine. This mixing tank is a special part of the structure appearing in my concurrent patent application on peeling apparatus, Serial No. 273,595.

The objects of the invention are to provide an effective means of removing the contents of a drum of caustic soda and admixing it with water. As heretofore practised, in the mixing the drums or barrels have simply been chopped open and the contents scooped out. As the powdered material is caustic it is highly offensive and injurious to the workmen. There is also much waste of time causing delay in the operation of the machine. I provide a means of removing the contents of the drum and admixing it with water without this unnecessary process, and insure the removal of the contents without undue labor and a very effective dissolving of the caustic soda.

Objects of my invention pertaining to details and modes of construction and operation will appear from the description to follow.

I accomplish the objects of my invention by the devices and means described in the following specification. The invention is clearly defined and pointed out in the claims.

A structure which is a preferred embodiment of my invention is fully illustrated in the accompanying drawing, in which:

Figure I is a plan view of a structure embodying my invention.

Fig. II is a vertical sectional elevation view taken on line 2—2 of Figs. I and III, the elevating crane and connections for it being shown in full lines.

Fig. III is a detail transverse sectional elevation taken on line 3—3 of Figs. I and II.

In the drawing similar reference characters refer to similar parts throughout the several views, and the sectional views are taken looking in the direction of the little arrows at the ends of the section lines.

Considering the numbered parts of the drawing, 1 is a square open-top tank supported on any suitable base or scaffold, 2 is a cradle within the bottom of the same to receive a drum of caustic soda or other similar material to be dissolved. 3 is a transverse screen to retain undissolved material and permit the solution to pass. 4 is the discharge pipe from the structure, provided with branch connection 5 with suitable valve 6 being connected to the bottom of the screened part of the tank and the pipe 7 with its controlling valve 8 being connected a considerable distance up the side of the screened part of the tank, as clearly appears in Fig. III.

A supply pipe 9 is connected by swinging nozzle 10 to deliver downwardly over the upper central portion of a drum of caustic that has been placed within the tank 1. 11 is a supply pipe controlled by globe valve 11' leading from the lye circulating system of a peeling machine. 12 is a water pipe for supplying fresh water, controlled by a globe valve 12'. 13 is a steam pipe controlled by globe valve 13'.

These all deliver to the pipe 9 so that this pipe can be supplied with mixture from the circulating system or with clear water or with steam or with a mixture in any proportion desired of either such steam, water or circulating mixture. The same can be delivered directly down within the mixing tank 1 and onto the contents of a drum or barrel.

In use a drum 14 of caustic soda is placed upon the cradle 2. A hole 15 is chopped in the top to receive the discharge from the swinging nozzle 10, and holes 16, 16 are chopped into the lower portion of the heads of the drum as it is placed upon the cradle. The drum itself becomes when opened in this way an effective means of circulating the solution in contact with the caustic insuring prompt and thorough mixing. The drum is swung to position by the crane 17, the swinging arm 18 of which is adapted to swing over the tank 1 and swing the carrying tongs 19, which are adapted to engage the drum of caustic soda. A cable 20 passed over the usual guide pulleys to a windlass 21 is controlled by a crank 22 for raising and lowering the load.

As my invention does not pertain to the details of this hoist and crank, I have not described the same specifically, further than to indicate the method of their use in this behalf. Of course, it goes without saying that the screen could be dispensed with here and that a discharge from the bottom of the tank alone would probably be sufficient, although the double discharge enables the proper manipulation of the fluid in the mixing tank so that the complete dissolving of the contents of the drum is accomplished by raising the level of the liquid in the tank. Strong circulation is thus insured to all parts of the drum.

Having thus described my invention, what I claim as new and desire to secure by Letters Patent, is:

1. The combination of a mixing tank, a screen partition therein to separate a portion therefrom, a discharge pipe with valved connections at the bottom and at one side of the tank for discharging the contents of the tank, a cradle within the tank for receiving and supporting a drum of caustic soda, a swinging nozzle to deliver downwardly onto the contents of said drum, and a drum with open top side and ends on said cradle to coact with said nozzle, coacting as specified.

2. The combination of a mixing tank, a screen partition therein to separate a portion therefrom, a discharge pipe for discharging the contents of the tank, a cradle within the tank for receiving and supporting a drum of caustic soda, a swinging nozzle to deliver downwardly onto the contents of said drum, and a drum with open top side and ends on said cradle, to coact with said nozzle, coacting as specified.

3. The combination of a mixing tank, a screen partition therein to separate a portion therefrom, a discharge pipe with valved connections at the bottom and at one side of the tank for discharging the contents of the tank, and a drum with open top side and ends on a supporting cradle, coacting as specified.

4. The combination of a mixing tank, a screen partition therein to separate a portion therefrom, a discharge pipe for discharging the contents of the tank, and a drum with open top side and ends on a supporting cradle, coacting as specified.

5. The combination of a mixing tank, a screen partition therein to separate a portion therefrom, a discharge pipe with valved connections at the bottom and at one side of the tank for discharging the contents of the tank, a cradle within the tank for receiving a drum of caustic soda, and a swinging nozzle to deliver downwardly onto the contents of said drum, coacting as specified.

6. The combination of a mixing tank, a screen partition therein to separate a portion therefrom, a discharge pipe for discharging the contents of the tank, a cradle within the tank for receiving a drum of caustic soda, and a swinging nozzle to deliver downwardly onto the contents of said drum, coacting as specified.

In witness whereof, I have hereunto set my hand and seal in the presence of two witnesses.

SAMUEL J. DUNKLEY. [L. S.]

Witnesses:
LUELLA G. GREENFIELD,
MARTHA J. GREGORY.